Figure 1:
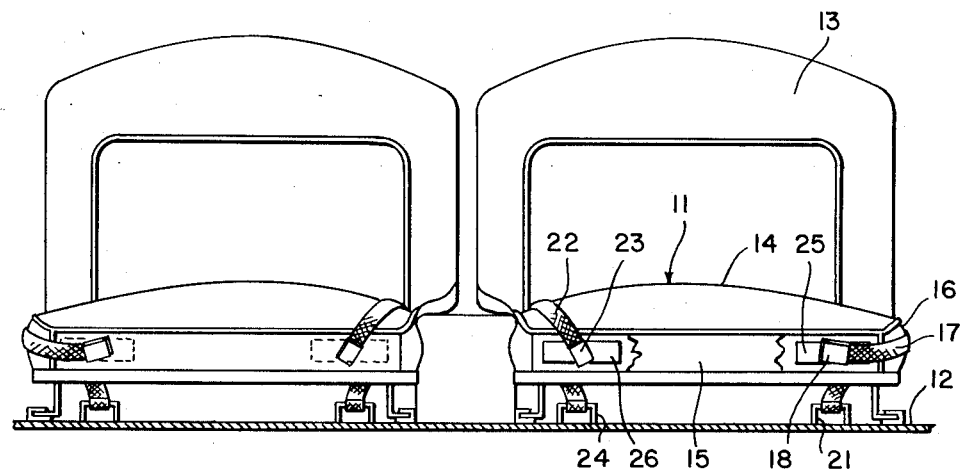

July 2, 1963     J. G. CONNELL     3,096,122

SAFETY SEAT

Filed March 16, 1962

INVENTOR.
JOHN G. CONNELL
BY John D. Myers
ATTORNEY.

United States Patent Office 3,096,122
Patented July 2, 1963

3,096,122
SAFETY SEAT
John G. Connell, 232 Wyoming Ave., West Pittston, Pa.
Filed Mar. 16, 1962, Ser. No. 180,184
1 Claim. (Cl. 297—385)

This invention relates to seats and safety belts for use in vehicles such as automobiles, aircraft, or motorboats, and the like.

Seat belts in vehicles have proved valuable in preventing serious injuries and saving lives when a vehicle is in a collision. However, many people dislike having seat belts in their vehicles because such belts are very often in the way when not in use. Moreover, the usual seat belt when not in use is generally in a position where it is not easily accessible and ready for quick and convenient application. For instance, the parts of the seat belt may have fallen under the seat, or may be caught between the bottom of the seat and the backrest or between the car floor and the door when the latter is closed.

Women particularly hesitate to use the usual seat belts because they rapidly become dirty when they are allowed to rest on the car floor in a haphazard manner or to fall through the door, when it is open, and drag on the ground.

Accordingly, it is an object of this invention to provide an improved safety seat and belt therefor which overcomes the foregoing problems, and wherein means are provided for holding the seat belt out of the way but in a readily accessible position when not in use.

Figure 2:
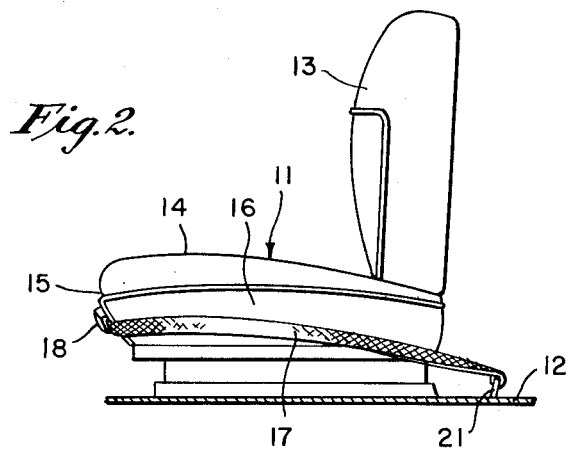

Other objects and advantages of this invention, including its simplicity and economy, as well as the ease with which it may be adapted to existing equipment, will further become apparent hereinafter and in the drawings in which:

FIG. 1 is a view in front elevation of a safety seat constructed in accordance with this invention; and FIG. 2 is a view in side elevation of the seat of FIG. 1.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a safety seat which includes a seat bottom 11 which is suitably supported above the vehicle floor 12, and a backrest 13 extending substantially upright from the rear of seat bottom 11. Seat bottom 11 has a horizontal surface 14, a front surface 15 and side surfaces 16.

A belt strap 17, which may be made of any flexible belt material, is provided with a magnetized buckle 18 at one end, and is anchored at the other end by anchor bracket 21 to vehicle floor 12 behind backrest member 13.

The companion belt strap 22 is provided at one end with a magnetized metal tip 23 which is adapted to be inserted through buckle 18. The other end of strap 22 is anchored to vehicle floor 12 by anchor bracket 24.

A metal plate 25 is mounted on front surface 15 of seat bottom 11 adjacent one side of the seat. Metal plate 25 cooperates with magnetized buckle 18 to magnetically hold the buckle 18 in fixed position when the seat belt is not being used.

Similarly, a metal plate 26 is mounted on front surface 15 of seat bottom 11 adjacent the opposite side of the seat and is adapted to cooperate with the magnetized metal tip 23 to magnetically hold tip 23 when the seat belt is not buckled around a sitter.

In operation, the seat belt is fastened around the sitter in the usual manner by passing metal tip 23 through buckle 18. However, when the seat belt is not in use, straps 17 and 22 are held in a conveiient and accessible position by the magnetic force between buckle 18 and plate 25, and tip 23 and plate 26, so as not to be dislodged by vibration or accidental displacement. Straps 17 and 22 are thus conveniently positioned to be taken one in each hand for buckling around the sitter.

It will, of course, be realized that metal plates 25, 26 may be magnetized instead of buckle 18 and metal tip 23. Other arrangements of magnetic elements for holding the buckle and metal tip to the metal plates will be readily apparent to those skilled in the art. Also, the metal plates may be placed on opposite sides of said bottom 11 on side surfaces 16, if desired, or a single metal plate may be placed across front surface 15.

It is to be understood that the form of the invention herewith shown and described is to be taken as a presently preferred embodiment. Various changes may be made in the shape, size and arrangement of parts. For example, parts may be reversed, and equivalent elements may be substituted for those illustrated and described herein, such as making the seat belt of a single strap anchored in the middle with its end portions constituting the respective straps, and making the two metal plates in one piece, all without departing from the spirit or scope of the invention as defined in the subjoined claim.

The claimed invention:

A safety seat for a vehicle comprising a seat having a bottom, a first belt strap having one end securely anchored, a metal buckle affixed to the other end of said first belt strap, a second belt strap having one end securely anchored, a metal tip affixed to the other end of said second belt strap and adapted to be inserted in the buckle, and two metal plates mounted on the seat bottom, the buckle and the tip being each adapted to contact and form a magnetic pair with the respective plates when the belt straps are not in use and one of the elements of each such pair having a magnetic attraction for the other sufficient to hold the corresponding belt strap in convenient, readily accessible position for use.

References Cited in the file of this patent
UNITED STATES PATENTS

| | | |
|---|---|---|
| 2,212,326 | Piken | Aug. 20, 1940 |
| 2,848,250 | Sheron | Aug. 19, 1958 |
| 2,868,309 | Burgess | Jan. 13, 1959 |
| 3,030,680 | Wilhelm | Apr. 24, 1962 |